United States Patent [19]

Carpenter

[11] Patent Number: 4,553,731
[45] Date of Patent: Nov. 19, 1985

[54] FAIL-CLOSED, TIGHT SEAL GAS SAFETY VALVE SYSTEM

[75] Inventor: John A. Carpenter, Valparaiso, Ind.

[73] Assignee: Bethlehem Steel Corporation, Bethlehem, Pa.

[21] Appl. No.: 648,101

[22] Filed: Sep. 7, 1984

[51] Int. Cl.[4] ............................................. F16K 31/42
[52] U.S. Cl. ........................................ 251/27; 251/62; 251/233; 251/305; 251/338; 110/163
[58] Field of Search .................... 251/27, 30, 31, 305, 251/338, 233, 62; 110/163

[56] References Cited

U.S. PATENT DOCUMENTS

| | | | |
|---|---|---|---|
| 861,675 | 7/1907 | Rosser | 251/27 X |
| 2,600,499 | 6/1952 | Harrower | 251/233 |
| 3,258,229 | 6/1966 | Larson | 251/30 X |
| 3,704,721 | 12/1972 | Schmitz et al. | 137/102 |
| 4,200,258 | 4/1980 | Gliatas | 251/214 |
| 4,412,670 | 11/1983 | Card et al. | 251/14 |

FOREIGN PATENT DOCUMENTS

WO81/3056 10/1981 PCT Int'l Appl. ................. 110/163

Primary Examiner—Samuel Scott
Assistant Examiner—Allen J. Flanigan
Attorney, Agent, or Firm—John F. Lushis

[57] ABSTRACT

A fail-closed gas safety valve system for blast furnace stove operations employing two tight seal butterfly valves, one a gas shutoff valve and the other a gas regulating valve, which together operate to prevent the leakage of hazardous gas into a blast furnace stove area in the event the supply of air to the stove is interrupted because of a power or a hydraulic failure.

2 Claims, 5 Drawing Figures

FAIL-CLOSED, TIGHT SEAL GAS SAFETY VALVE SYSTEM

BACKGROUND OF THE INVENTION

In a typical blast furnace operation, several stoves act to preheat the air that is blown into the blast furnace. This air is heated in the stoves by burning combustible carbon monoxide gas which is a by-product gas resulting from the interaction of carbon dioxide and coke in the furnace operations. Air for the combustion of the carbon monoxide is provided by large fans called burner fans. These fans are operated by an electrical energy source but the air intake on the fans is regulated by hydraulically-powered louvres. Thus, a power failure or a hydraulic failure will interfere with the proper functioning of the fans. In the event the flow of air from these fans to the stove is interrupted due to a power or a hydraulic failure, it is important that no carbon monoxide gas leak into the blast furnace stove area from the gas supply line connecting the furnace to the stove, since leaking carbon monoxide gas presents a safety hazard. In normal blast furnace operations, the potential exists for large amounts of carbon monoxide gas to leak into an area where it can pose a serious threat to human life.

A blast furnace stove usually has two valves which together act as a safety device to prevent the leakage of carbon monoxide gas. One of the valves operates as a gas shutoff valve and controls the flow of gas from the gas supply line to an area known as the gas burner passageway near the stove. This valve is ordinarily a tight seal butterfly valve and is often actuated by a mechanical device such as a motor. A tight seal valve is one which has a seal around the valve seat. The second valve operates as a combination gas regulating valve and safety valve. As its name implies, this valve regulates the amount of gas fed into the blast furnace stove while also performing a safety function, as described below. This valve is usually a clearance-type butterfly valve. Unlike a tight seal valve, the design of a clearance-type valve is such that when the valve is in a closed position, there is still a small amount of space, e.g. 1/16 of an inch between the valve disc and valve seat. This design feature results in a 1-2% leakage when the valve is closed.

The stove valve system operation is ordinarily designed so that the gas regulating valve can be driven to the open position only after the burner fan is operating and the gas shutoff valve is opened. When the gas shutoff valve is closed, the gas regulating valve is also driven to the closed position. This design allows the gas regulating valve to act as a safety device also.

One problem with such valve system, however, is that in the event of a power or a hydraulic failure, the gas shutoff valve, which is usually mechanically activated, must be manually closed. Manual closure is difficult because the gas shutoff valve is a tight seal butterfly valve which requires a large amount of force in order to be closed. Furthermore, manual closure is hazardous because if the gas regulating and safety valve does not fail-closed, carbon monoxide will leak into an area where a worker must enter in order to close the gas shutoff valve. By fail-closed is meant complete closure of a valve disc in the event of a power or a hydraulic failure. Clearance-type valves such as the gas regulating and safety valve, unlike tight seal butterfly valves, require less force for closure, but their operating mechanisms will not always cause these valves to fail-closed in the event of a power or a hydraulic failure. In addition, even when such clearance-type valves do fail-closed, their design is such that there is a 1-2% leakage, as mentioned above. Thus, substituting a clearance-type valve for a tight seal valve has not completely solved problems relating to the fail-closing of blast furnace stove valves.

In an attempt to eliminate manual closure of valves, devices known as magnetic clutches, which are operated by an external energy source, have been used in conjunction with various actuators. Under normal operating conditions, the clutch is energized allowing the valve to be in the open position. In the event of a power failure, the clutch is de-energized allowing the valve to close. The use of such clutches, however, has not eliminated problems relating to the fail-closing of valves, i.e., some valves still do not fail-closed even with such clutches. Actuators operated by external energy sources have also been employed in valve systems but these actuators have not always been successful in eliminating problems relating to the fail-closing of valves. Furthermore, valve systems employing various types of actuators have resulted in complex valve systems. Because they have a substantial number of parts, complex valve systems are expensive and problems with reliablity occur more often because of an increase in the frequency of part breakdown.

SUMMARY OF THE INVENTION

It is an object, therefore, of this invention to provide a fail-closed gas safety valve system to prevent the leakage of carbon monoxide gas in blast furnace stove operations in the event of a power or a hydraulic failure.

It is also an object of this invention to provide such a gas safety valve system which incorporates a minimal number of parts, thus making it less expensive and more reliable than more complex systems.

The present invention accomplishes these objectives by employing two valves. The first valve is an elastic-seated tight seal butterfly valve which acts as a shutoff and safety valve. This valve is actuated by a single acting cylinder which is controlled by a three-way solenoid valve. Under normal operating conditions, i.e., when carbon monoxide gas is being burned in the blast furnace stove, the solenoid on the solenoid valve is energized allowing fluid to be pumped from a fluid reservoir into the cylinder. The fluid will push against the piston in the cylinder and cause the shutoff valve to open. In the event of a power failure, the solenoid will become de-energized allowing the fluid to drain out of the cylinder, the piston to retract, and the shutoff valve to close. Likewise, in the event of a hydraulic failure, fluid will drain out of the cylinder, the piston will retract, and the shutoff valve will close. The use of a counterweight attached to the shutoff valve and a linkage system which progessively increases leverage and connects the shutoff valve to the actuator will insure that the valve completely closes, i.e., fail-closes.

The second valve in the new system is also an elastic-seated tight seal butterfly valve which acts as a gas regulating and a safety valve. This valve is actuated by a double acting cylinder operated in conjunction with a standard two-way solenoid valve and a standard servovalve. The servovalve design employs a conventional closed loop position control system which acts to control the double acting cylinder, and, thus, controls the degree of opening of the gas regulating valve. Under normal operating conditions, the solenoid on the solenoid valve and the balancing coils of the servovalve are energized. As a result, the two-way solenoid valve is in the closed position which allows the energized servovalve to modulate the fluid pumped from the fluid reservoir through the servovalve into the cylinder. As with the shutoff valve, the fluid will push against the piston. This causes the gas regulating valve to control the flow of gas into the stove. In the event of a power failure, the solenoid of the solenoid valve and the balancing coils of the servovalve will become de-energized causing the two-way solenoid valve to open and the modulation of the fluid by the servovalve to cease. The fluid will be forced from the closed end of the cylinder into the rod end, the piston will retract, and the gas regulating valve will close. Likewise, in the event of a hydraulic failure, the fluid will change ends in the cylinder, the piston will retract, and the gas regulating valve will close. As with the shutoff valve, the use of a counterweight attached to the gas regulating and safety valve and a linkage system connecting the valve to the actuator will insure that the gas regulating valve fail-closes. Since the servovalve has some leakage, the difference in the volume of fluid between the rod end of the cylinder and the closed end of the cylinder will drain back into the reservoir, thus allowing the gas regulating valve to fail-closed and eliminating the need for the use of a double rod cylinder. Consequently, because the design of the valve system is such that both the gas shutoff and gas regulating valves will fail-closed, both valves will also act as safety devices to prevent the leakage of carbon monoxide gas into the blast furnace stove in the event of a power or a hydraulic failure.

An additional advantage to the above-described system is that the system can be easily checked for proper operation. During the course of blast furnace operations a stove is not always burning carbon monoxide and, as a result, the solenoid valve and servovalve are from time to time de-energized. If a particular valve is not closing properly, the defect can be easily detected and corrected during such times of intentional de-energization when the possibility of leaking carbon monoxide gas does not exist.

An alternate embodiment of the above-described two valve system is to eliminate the use of the gas shutoff valve. As a result, the single valve will perform three functions: the shutoff, gas regulating, and safety functions. In this one valve system, it is essential that the valve be a tight seal butterfly valve which will operate in the same manner as the gas regulating valve described above.

PREFERRED EMBODIMENT

Figure 1:
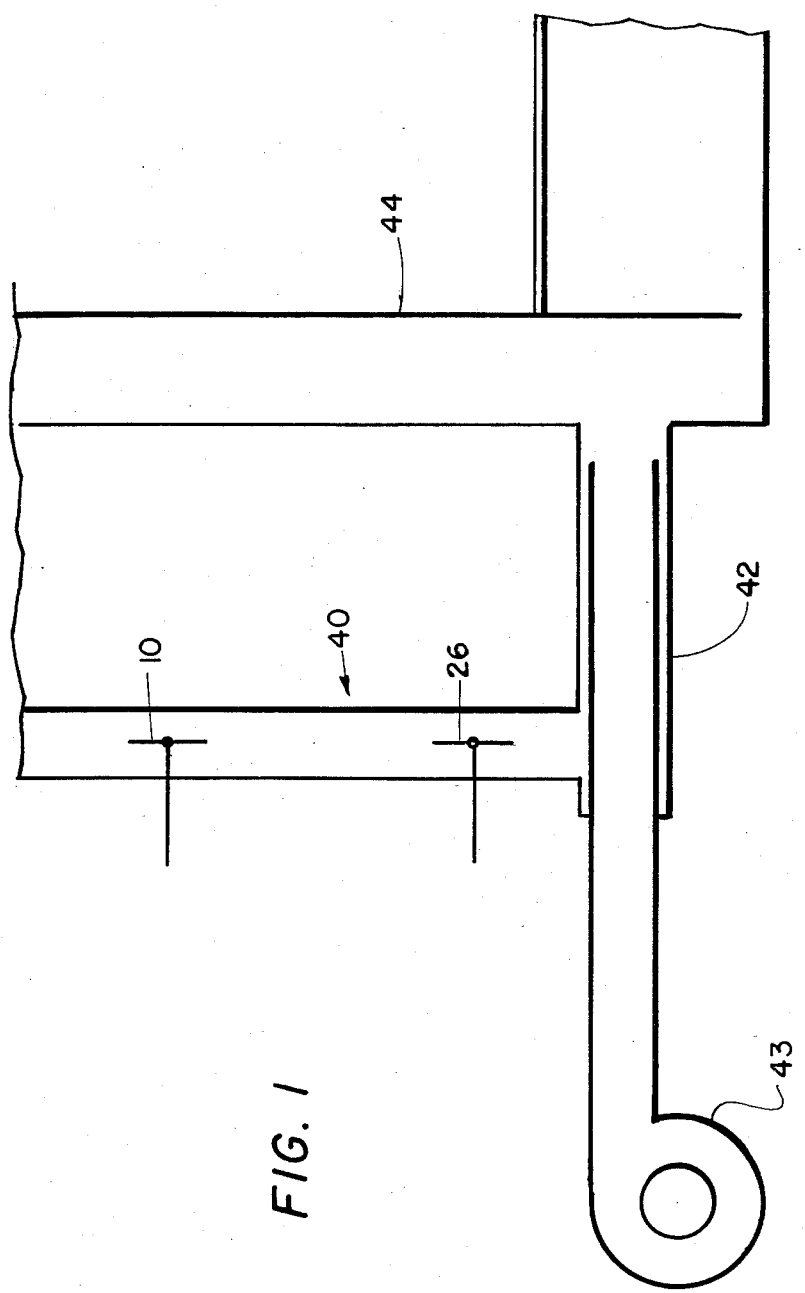
FIG. 1 - shows generally the arrangement of the gas safety valve system of this invention in a blast furnace.
Figure 2:
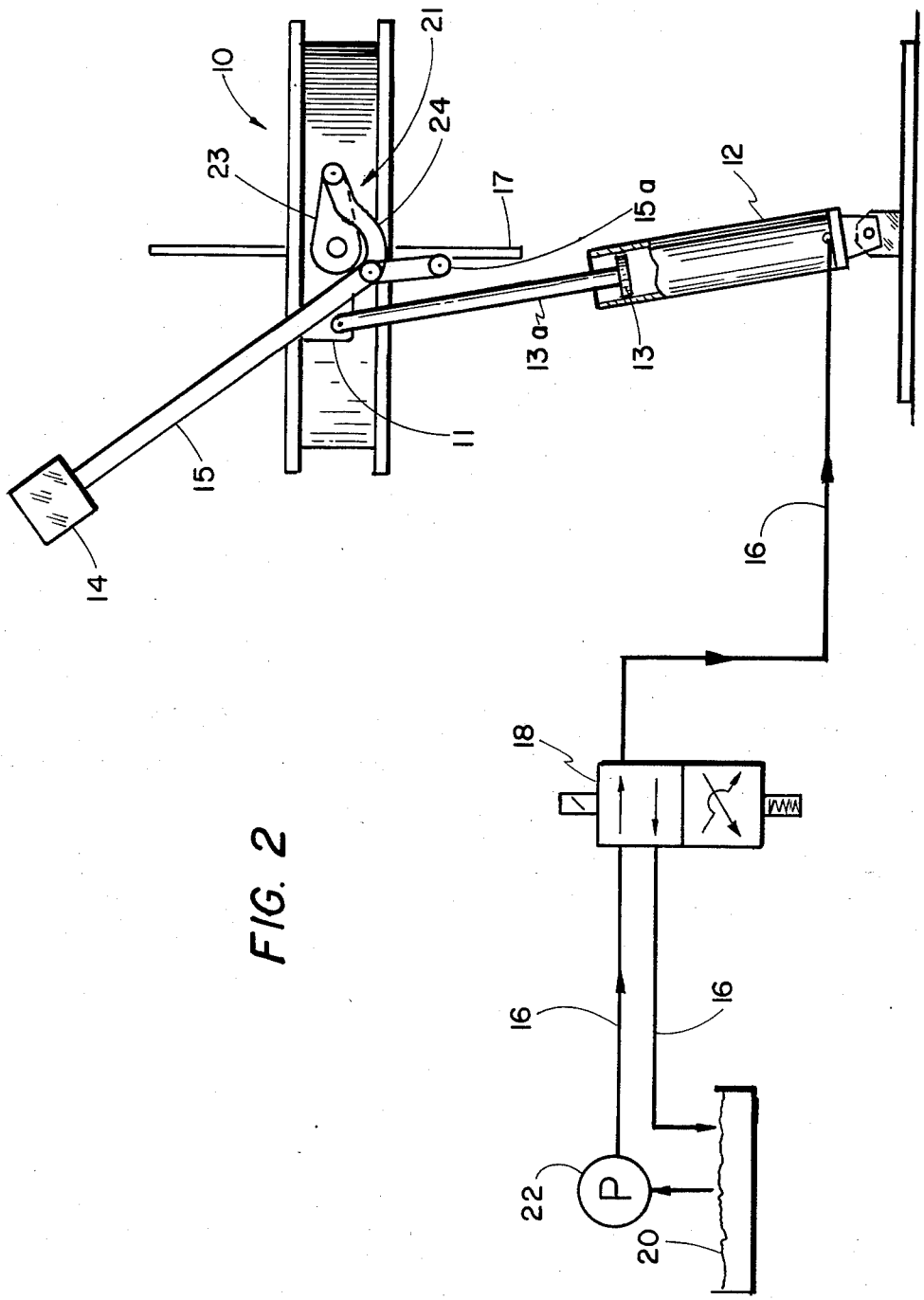
FIG. 2 - shows the tight seal butterfly valve which operates as the gas shutoff and safety valve in the gas safety valve system of this invention in conjunction with a three-way solenoid valve with the gas safety and shutoff valve in an open position.
Figure 3:
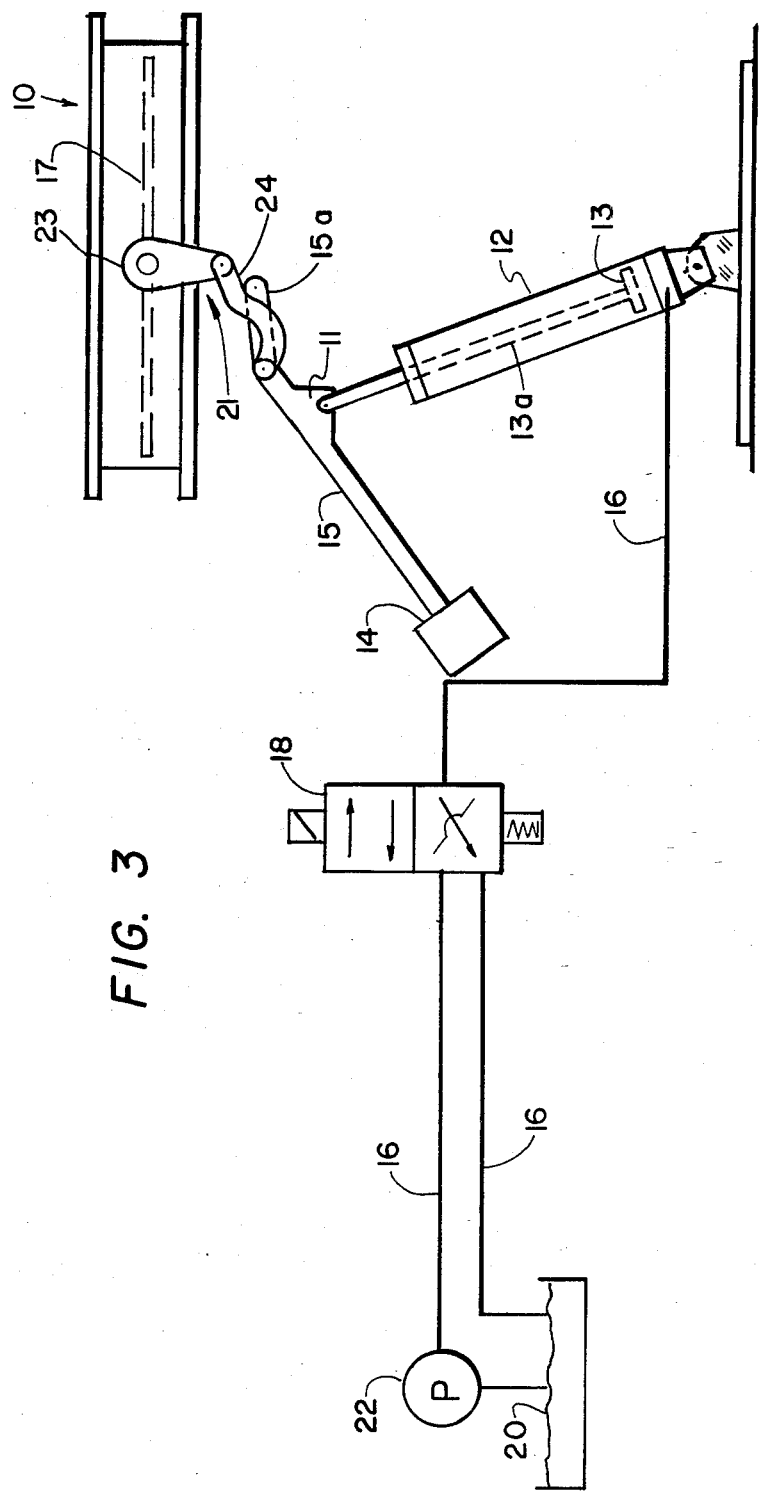
FIG. 3 - is substantially the same view as FIG. 1, except the gas shutoff and safety valve is closed.

Referring now to FIGS. 1, 2, and 3 for a detailed description of the invention, FIG. 1 shows generally the arrangement of two tight seal elastic-seated butterfly valves, gas shutoff and safety valve 10 and gas regulating and safety valve 26, in gas supply line 40 in a blast furnace. Burner fan 43 blows air into burner passageway 42 whereupon it enters stove 44. In FIGS. 2 and 3, gas shutoff and safety valve 10 is shown having a cylinder actuator 12 with piston 13 therein and a counterweight 14 attached to valve 10 by lever 15. Fluid lines 16 connect spring-closed three-way solenoid valve 18 to single acting cylinder actuator 12 and fluid reservoir 20. Under normal operating conditions, i.e., when carbon monoxide gas is being burned in a blast furnace stove, fluid is pumped out of reservoir 20 by pump 22 to solenoid valve 18. Solenoid valve 18 is energized by an external energy source e.g., electric current, which causes solenoid valve 18 to be in a position to allow fluid to pass in fluid lines 16 through solenoid valve 18 and into cylinder actuator 12. As fluid enters cylinder actuator 12, piston 13 is forced upward causing valve disc 17 of gas shutoff and safety valve 10 to open. As long as solenoid valve 18 continues to remain energized and fluid is pumped out of fluid reservoir 20, gas shutoff and safety valve 10 will remain open. In the event, however, of a power failure, solenoid 18 will become de-energized and fluid will no longer be flowing in fluid lines 16 to cylinder actuator 12. Similarly, in the event of a hydraulic failure, fluid will no longer be flowing in fluid lines 16 to cylinder actuator 12. In the event of such a power or a hydraulic failure, fluid will flow out of cylinder actuator 12 causing piston 13 to retract and valve disc 17 of gas safety and shutoff valve 10 to close, thereby shutting off the flow of gas from the furnace to burner passageway 42 and preventing the leakage of carbon monoxide gas into the blast furnace stove. Counterweight 14 attached to valve 10 and linkage system 21, which connects valve 10 to cylinder actuator 12, insure that valve 10 will fail-closed. Linkage system 21 is shown comprising levers 24 and 15 with lever 24 pivotally connected to valve lever 23 and lever 15 pivotally connected to lever 24. Piston rod 13a of cylinder actuator 12 is attached to flange 11 which is welded to lever 15. The operation of linkage system 21 is such that lever 15 rotates about fixed pivot point 15a as valve 10 opens and closes. As a result, linkage system 21 progressively increases leverage and reduces the force needed to open and close valve 10 and compensates for the non-linear flow characteristics of gas flow through valve 10 by increasing the rate of movement of valve disc 17.

Figure 4:
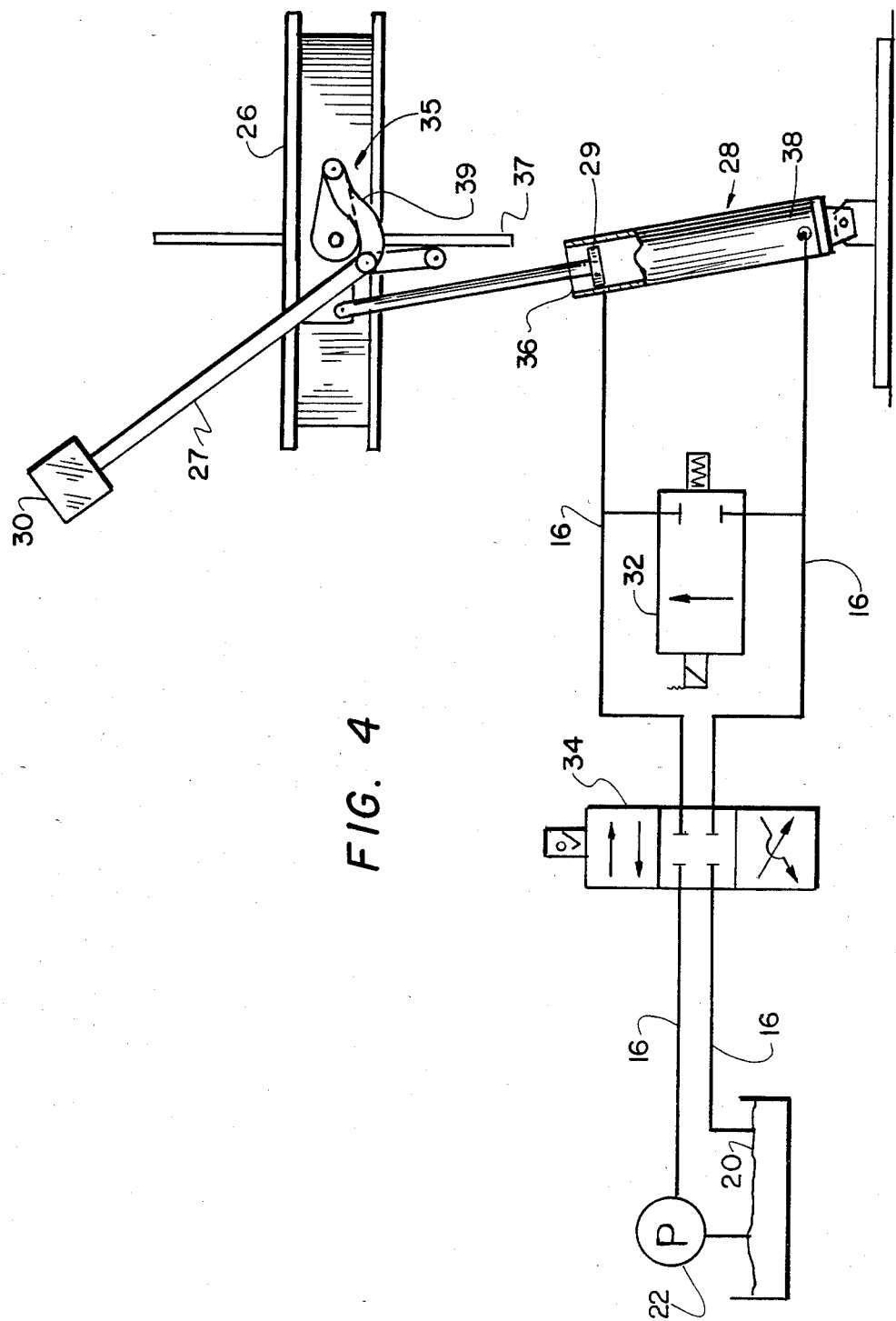
FIG. 4 - shows the tight seal butterfly valve which operates as the gas regulating and safety valve in the gas safety valve system of this invention in conjunction with a double acting solenoid valve and servovalve with the gas regulating and safety valve in a position to control gas flow into the blast furnace stove.
Figure 5:
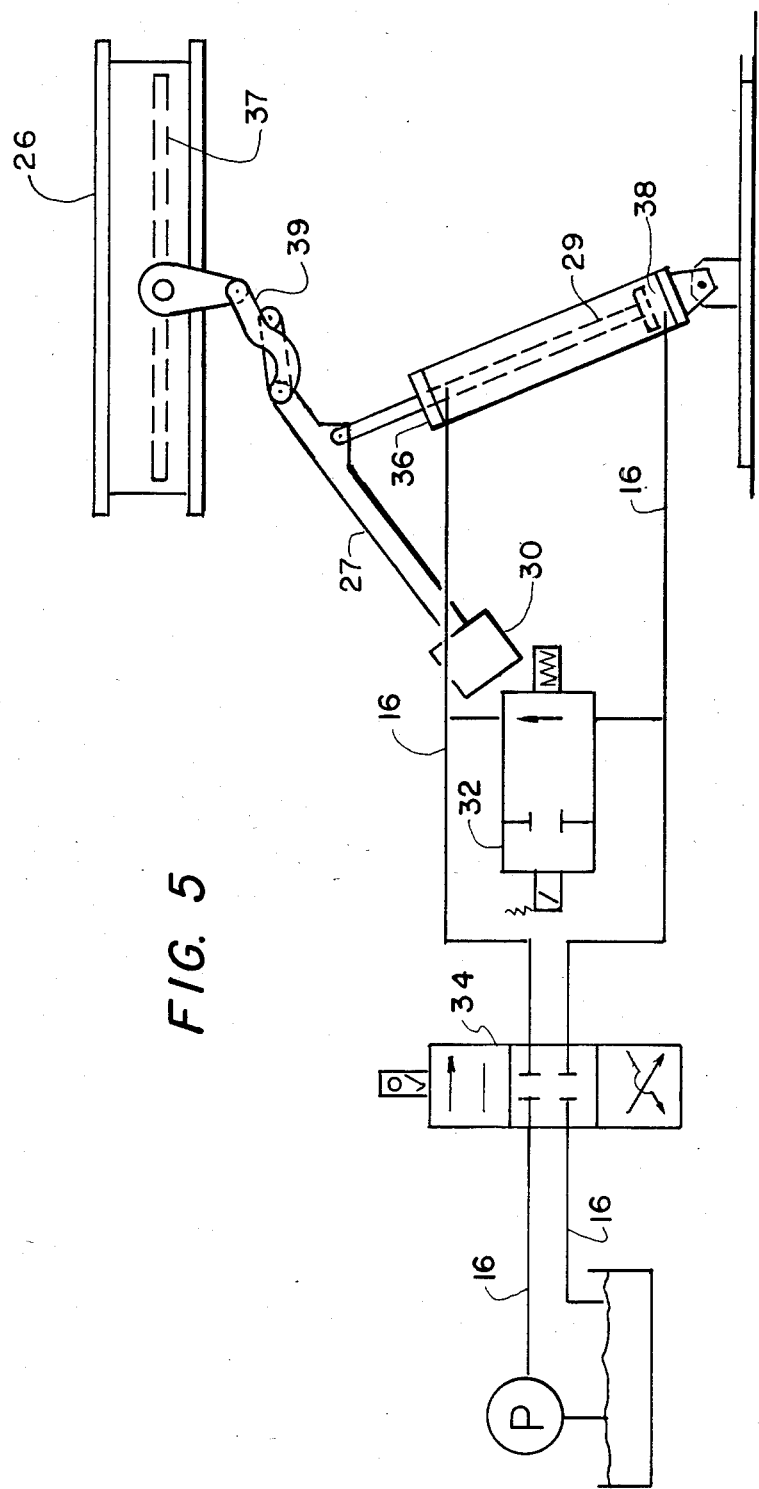
FIG. 5 - is substantially the same view as FIG. 3, except the gas regulating and safety valve is closed.

Referring now to FIGS. 4 and 5, gas regulating and safety valve 26 is shown having double acting cylinder actuator 28 with piston 29 therein and a counterweight 30 which is attached to gas regulating valve 26 by lever 27. Fluid lines 16 connect cylinder actuator 28 to solenoid valve 32, solenoid valve 32 to servovalve 34, and servovalve 34 to fluid reservoir 20. Under normal operating conditions, solenoid valve 32 is energized so that it is in a closed position. This allows servovalve 34, which is also energized, to modulate fluid flow to double acting cylinder actuator 28. Thus, fluid can be pumped out of fluid reservoir 20 by pump 22 in fluid lines 16 and through servovalve 34 into cylinder actuator 28. As fluid enters cylinder actuator 28, piston 29 is forced upward causing valve disc 37 of gas regulating valve 26 to be in a position to control gas flow into the blast furnace stove. As long as solenoid valve 32 and servovalve 34 remain energized and fluid is pumped out of reservoir 20, gas regulating valve 26 will control gas flow. In the event of a power failure, solenoid valve 32 and servovalve 34 will become de-energized in which event solenoid valve 32 will open and the modulation of fluid by servovalve 34 will cease. As a result, fluid will no longer be flowing in fluid lines 16 to cylinder actuator 28. Similarly, in the event of a hydraulic failure, fluid will not flow through fluid lines 16 into cylinder actuator 28. In the event of such a power or a hydraulic failure, fluid will flow out of the closed end 38 of cylinder actuator 28 into rod end 36 of cylinder actuator 28 causing piston 29 to retract and valve disc 37 of gas regulating valve 26 to close. Upon closure, valve 26 will cease controlling gas flow into the blast furnace stove and prevent the leakage of carbon monoxide into the stove. Counterweight 30 attached to valve 26 and linkage system 35 consisting of lever 39 and lever 27, which operates in a manner similar to linkage system 21 described above, insure that valve 26 will fail-closed. Since servovalve 34 has some leakage, the difference in the volume of fluid between the closed end 38 of cylinder actuator 28 and rod end 36 of cylinder actuator 28 will drain back into reservoir 20, thus insuring that gas regulating valve 26 fail-closes.

Although I have described my invention with particular application to blast furnace stove operations, the invention may have other applications and I do not wish to have my invention limited to blast furnace stove operations.

ALTERNATE EMBODIMENT

An alternate gas safety valve system blast furnace stove operations is the same system as described above except that the use of gas shutoff valve 10 has been eliminated. As a result, tight seal butterfly valve 26, operating in conjunction with solenoid valve 32 and servovalve 34 in the same manner as described above, will perform both the gas regulating and shutoff functions and will also act as a safety valve in the event of a power or a hydraulic failure.

I claim:
1. A fail-closed, tight seal gas safety valve system for blast furnace stove operations comprising:
 (a) An elastic-seated tight seal butterfly valve which is actuated by a single acting cylinder controlled by a solenoid valve, the operation of said tight seal butterfly valve being such that when carbon monoxide is being burned in a blast furnace stove, the solenoid on said solenoid valve is energized, thereby allowing fluid to be pumped from a fluid reservoir through said solenoid valve into said cylinder, whereupon the piston in said cylinder will move upward causing said tight seal butterfly valve to open and allowing gas to flow from the furnace to the burner passageway, and the operation of said tight seal butterfly valve being such that in the event of a power failure, said solenoid on said solenoid valve will de-energize, thereby preventing fluid from flowing to said cylinder and allowing fluid to drain out of said cylinder, whereupon said piston will retract and a counterweight attached to and acting in conjunction with a progressively increasing leverage linkage system consisting of two pivotally-connected levers, one of which is attached to said shutoff valve via a third lever, the other of which is attached to said cylinder and carries said counterweight, will cause said butterfly valve to fail-closed, thereby shutting off the flow of gas from the furnace to the burner passageway and preventing the leakage of carbon monoxide gas into the stove, and the operation of said butterfly valve being such that in the event of a hydraulic failure, fluid will drain out of said cylinder causing said piston to retract and said butterfly valve to fail-closed because of the above-described counterweight and linkage system; and
 (b) A second elastic-seated tight seal butterfly valve which is actuated by a double acting cylinder operating in conjunction with a spring-closed two-way solenoid valve and a servovalve which controls said double acting cylinder, the operation of the said second butterfly valve being such that when carbon monoxide is being burned in the blast furnace stove, the solenoid on said solenoid valve and the balancing coils of said servovalve are energized causing said solenoid valve to close and allowing fluid to be pumped from the fluid reservoir through said servovalve into said cylinder, with the flow of the fluid being modulated by said servovalve, whereupon the piston in said cylinder will move upward allowing said second butterfly valve to regulate the amount of gas flow into the blast furnace stove, and the operation of said second butterfly valve being such that in the event of a power failure, said solenoid on said solenoid valve and said balancing coils of said servovalve will de-energize causing said solenoid valve to open, said servovalve to cease modulating fluid flow, and fluid to flow from the closed end of said cylinder to the rod end of said cylinder, thereby forcing said second butterfly valve to fail-closed with the aid of a counterweight and a linkage system in the same manner as described above for said butterfly valve of claim 1(a), whereupon said second butterfly valve will cease regulating the amount of gas flow in the blast furnace stove and prevent the leakage of carbon monoxide gas into the stove area, and the operation of said second butterfly valve being such that in the event of a hydraulic failure, said valve will fail-closed in the same manner in which it fail-closes in the event of a power failure as described above.

2. A fail-closed tight seal gas safety valve system for blast furnace stove operations comprising an elastic-seated tight seal butterfly valve actuated by a double acting cylinder operating in conjunction with a spring-closed two-way solenoid valve and a servovalve which controls said double acting cylinder the operation of said butterfly valve being such that when carbon monoxide is being burned in the blast furnace stove, the solenoid on said solenoid valve and the balancing coils of said servovalve are energized causing said solenoid valve to close and allowing fluid to be pumped from a fluid reservoir through said servovalve into said cylinder, with the flow of the fluid being modulated by said servovalve, whereupon the piston in said cylinder will move upward allowing gas to flow from the furnace through said butterfly valve to the burner passageway and also allowing said butterfly valve to regulate the amount of gas flow into the blast furnace stove, and the operation of said butterfly valve being such that in the event of a power failure, said solenoid on said solenoid valve and said balancing coils of said servovalve will de-energize causing said solenoid valve to open, said servovalve to cease modulating fluid flow, and fluid to flow from the closed end of said cylinder to the rod end of said cylinder, thereby forcing the piston in said cylinder to retract and said butterfly valve to fail-closed with the aid of a counterweight attached to and acting in conjunction with a progressively increasing leverage linkage system consisting of two pivotally-connected levers, one of which is attached to said shutoff valve via a third lever, other of which is attached to said cylinder and carries said counterweight, whereupon such fail closure said butterfly valve will shut off the flow of gas from the furnace to the burner passageway, cease regulating the amount of gas flow in the blast furnace stove, and prevent the leakage of carbon monoxide gas into the stove area, and the operation of said butterfly valve being such that in the event of a hydraulic failure, said butterfly valve will fail-closed in the same manner in which it fail-closes in the event of a power failure as described above.

* * * * *